United States Patent
Tseng

(10) Patent No.: US 9,083,858 B2
(45) Date of Patent: Jul. 14, 2015

(54) VEHICLE VIDEO RECORDING APPARATUS

(71) Applicant: KEN SEAN INDUSTRIES CO., LTD., Changhua Hsien (TW)

(72) Inventor: Yu-Fang Tseng, Changhua County (TW)

(73) Assignee: KEN SEAN INDUSTRIES CO., LTD., Changhua County (TW)

( * ) Notice: Subject to any disclaimer, the term of this patent is extended or adjusted under 35 U.S.C. 154(b) by 370 days.

(21) Appl. No.: 13/750,193

(22) Filed: Jan. 25, 2013

(65) Prior Publication Data
US 2013/0208119 A1 Aug. 15, 2013

(30) Foreign Application Priority Data
Feb. 14, 2012 (TW) .............................. 101202649 U

(51) Int. Cl.
*H04N 7/18* (2006.01)
*B60R 1/00* (2006.01)
*G07C 5/08* (2006.01)

(52) U.S. Cl.
CPC .. *H04N 7/18* (2013.01); *B60R 1/00* (2013.01); *B60R 2300/105* (2013.01); *B60R 2300/304* (2013.01); *G07C 5/0866* (2013.01); *H04N 7/181* (2013.01)

(58) Field of Classification Search
CPC .. B60R 2300/304; G07C 5/0866; H04N 7/18; H04N 7/181
USPC ......... 348/148, 152, 153, 159, 143, 116, 118; 340/937, 435
See application file for complete search history.

(56) References Cited

U.S. PATENT DOCUMENTS 5,680,123 A * 10/1997 Lee ................................ 340/937
8,405,725 B2 * 3/2013 McMahon et al. ............ 348/148

* cited by examiner

*Primary Examiner* — Jefferey Harold
*Assistant Examiner* — Jean W Desir
(74) *Attorney, Agent, or Firm* — Ming Chow; Sinorica, LLC

(57) ABSTRACT

A vehicle video recording apparatus has multiple cameras mounted on a car, a video processing unit electronically connected to the cameras, a storage unit for storing videos output from the cameras, and a control unit. The control unit has a signal detecting module for receiving vehicle status signals, a distance detecting module for sensing a distance between the car and an object, an output module for outputting warning signals, and a central control module for controlling the cameras based on the vehicle status signals. The vehicle video recording apparatus properly selects and activates the camera to record images around the car to enhance the driving safety.

7 Claims, 2 Drawing Sheets

VEHICLE VIDEO RECORDING APPARATUS

CROSS-REFERENCE TO RELATED APPLICATIONS

This application claims the benefit of Taiwan patent application No. 101202649, filed on Feb. 14, 2012, the disclosure of which is incorporated herein in its entirety by reference.

BACKGROUND OF THE INVENTION

1. Field of the Invention

The present invention relates to a vehicle video recording apparatus, and more particularly to a vehicle video recording apparatus capable of integrating videos outside and inside a car for dynamically recording video data.

2. Description of the Prior Art

A common vehicle video recording apparatus, either a rear view mirror-mounted type or windshield-mounted type, for capturing video in front of a car is often comprised of a camera and a memory device.

In recent years multiple cameras are applied in the car to capture and record surrounding images from different views. Although the driving safety is improved with the use of the multiple cameras, the video recording capacity still relies on the storage of the memory device. However, the continuous recording process of the vehicle video recording apparatus may result in some problems. For example, the life span of the memory device will be greatly shortened by the frequently memory erasing actions for recording newly captured video, provided that all cameras are regularly kept on for recording.

Furthermore, the most important purpose of the vehicle video recording apparatus is to preserve the key videos of particular events in case of emergency. Searching the key images from the vast amount of video data is difficult. In addition, the frequently data erasing to the memory device may remove the previously stored critical images.

To overcome the shortcomings, the present invention provides a vehicle video recording apparatus to mitigate or obviate the aforementioned problems.

SUMMARY OF THE INVENTION

The main objective of the present invention is to provide a vehicle video recording apparatus that uses multiple cameras to capture images around the car in different views and images in the car, and selectively activates proper cameras based on sensed statuses of the car.

The vehicle video recording apparatus comprises multiple cameras mounted on a car, a video processing unit electronically connected to the cameras, a storage unit for storing videos output from the cameras, and a control unit.

The cameras include a front camera for capturing views in front of the car; a rear camera for capturing views behind the car; a left side camera and a right side camera for respectively capturing views at left and right sides of the car; and an internal camera for capturing views in the car.

The control unit comprises a signal detecting module for receiving vehicle status signals, a distance detecting module for sensing a distance between the car and an object; an output module for outputting warning signals; and a central control module for controlling the cameras to store videos in the storage unit.

When the car is at rest and the signal detecting module detects a car-invasion signal, the central control module activates the internal camera and records the video output from the internal camera in the storage unit.

When the car is moving, the front camera is activated and the video from the front camera is stored in the storage unit; if the signal detecting module detects a turn signal, the central control module activates either the left side camera or the right side camera according to the turn signal, and records the videos from the left side camera and the right side camera in the storage unit.

When the distance detecting module senses an object behind the car within a predetermined region, the central control module activates the rear camera and records the video from the rear camera in the storage unit.

When the signal detecting module detects a lane departure signal, the central control module activates the front camera, the rear camera, the left side camera and the right side camera, and stores the videos thereof in the storage unit.

The cameras of the vehicle video recording apparatus can be selectively activated in accordance with different car statuses. Therefore, the memory unit can be prevented from being filled to its full capacity. In other words, the vehicle video recording apparatus will determine the present status of the car and dynamically choose the appropriate camera for recording.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
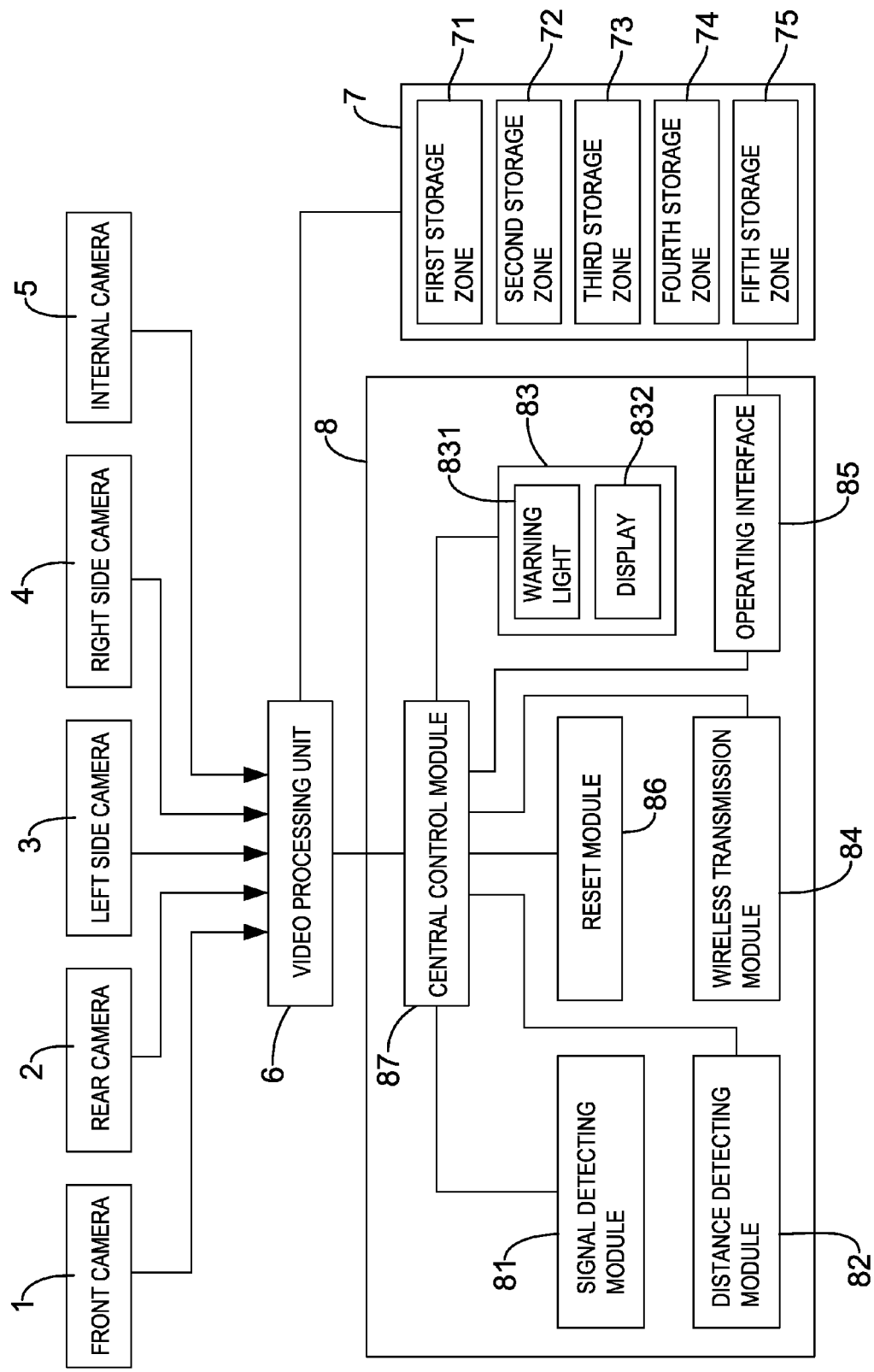
FIG. 1 shows a block diagram of a vehicle video recording apparatus of the present invention.
Figure 2:
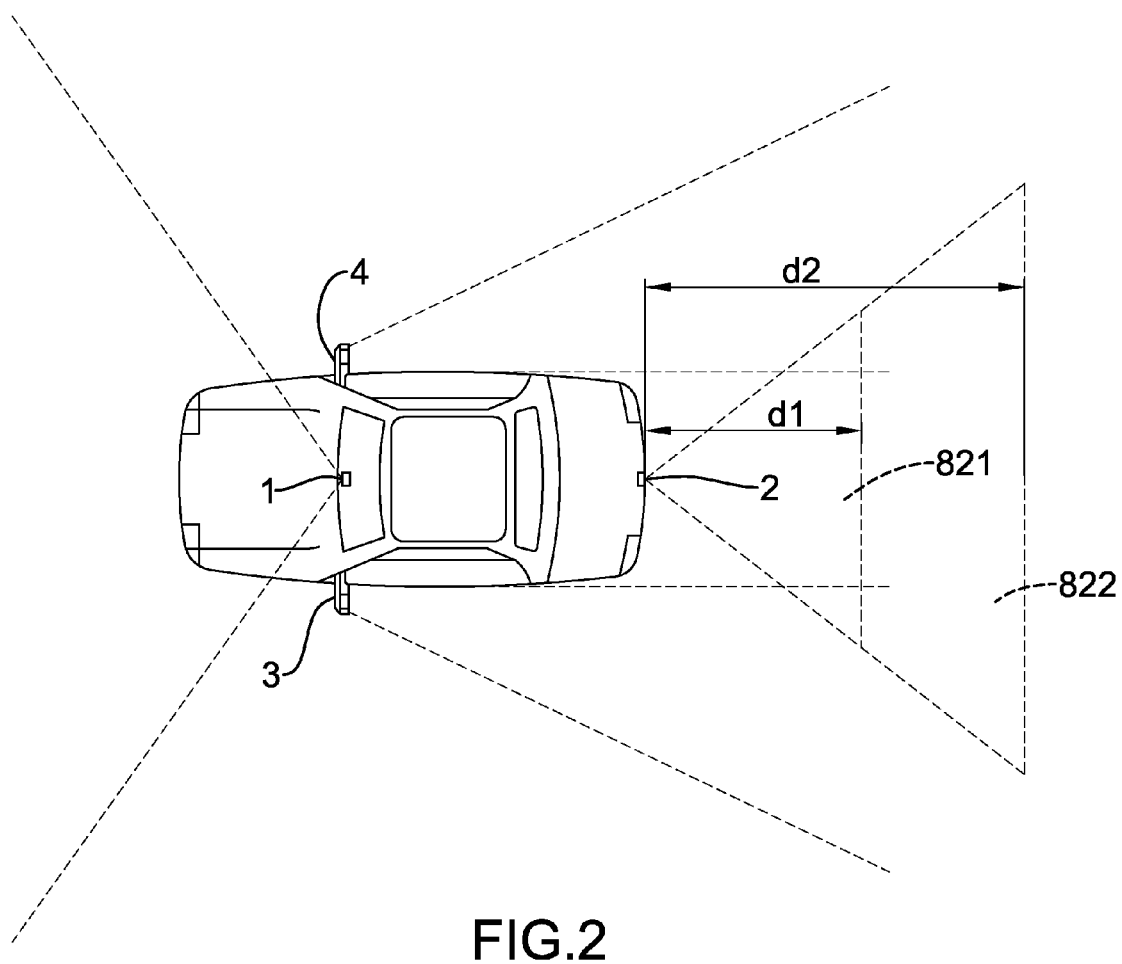
FIG. 2 shows an operational view showing the vehicle video recording apparatus installed in a car.

With reference to FIGS. 1 and 2, a vehicle video recording apparatus of the present invention comprises multiple cameras 1-5, a video processing unit 6 electronically connected to the cameras 1-5, a storage unit 7 electronically connected to the video processing unit 6 for storing recorded video from the cameras 1-5, and a control unit 8 electronically connected to the video processing unit 6 for turning on/off the cameras 1-5.

The cameras 1-5 are mounted on a car and comprises a front camera 1 for capturing views in front of the car, a rear camera 2 for capturing views behind the car, a left side camera 3 and a right side camera 4 for respectively capturing views at left and right sides of the car, and an internal camera 5 for capturing views in the car.

The control unit 8 comprises a signal detecting module 81 for receiving vehicle status signals, a distance detecting module 82 for sensing a distance between the car and an object, an output module 83 for outputting warning signals, a wireless transmission module 84, an operating interface 85, a reset module 86, and a central control module 87 for controlling the cameras 1-5 to store video in the storage unit 7.

The signal detecting module 81 receives different vehicle status signals such as a turn signal, a speed signal, a steering angle sensing signal, a lane departure signal, a CAN BUS signal, a gear signal, a compass signal, a G-sensor signal, a vibration signal, a microwave signal and a GPS satellite signal. The vehicle status signals are transmitted to the central control module 87 for determining which camera(s) 1-5 should be activated.

The distance detecting module 82 is installed in the car for sensing a distance between the car and an object behind the car. The distance detecting module 82 can be an infrared-based sensor or a radar sensor to measure the distance. Alternatively, the distance detecting module 82 may calculate the distance using the fuzzy analysis based on the captured images of the cameras 1-5. The distance detecting module 82 defines a first sensing region 821 with a first sensing distance d1, and a second sensing region 822 with a second sensing distance d2 greater than the first distance d1. In this embodiment, the first distance d1 is 8 meters and the second distance d2 is 15 meters. Any object in the first sensing region 821 or the second sensing region 821 is detectable by the distance detecting module 82.

The output module 83 comprises a warning light 831 and a display 832 in this embodiment, wherein the display 832 may show videos stored in the storage unit 7 or videos captured from the cameras 1-5 in real time. The output module 83 also outputs warning signals through the warning light 831, the display 832, or other elements such as a buzzer. The warning signals may be either visual or audio signals. The wireless transmission module 84 may be a communication signal transmission integrated circuit (IC) for transmitting signals to a remote device through GPRS, GSM or 3G technology.

The operating interface 85 allows a user to operate the video recording apparatus. In this embodiment, both the operating interface 85 and the display 832 are all mounted on the rear-view mirror in the car.

The reset module 86 is provided to reset the video recording apparatus. For example, if any module, circuit or camera in the video recording apparatus encounters errors, the reset module 86 can be triggered to bring the video recording apparatus to normal condition or initial state. The reset module 86 may comprise a button mounted adjacent to the operating interface 85 on the rear-view mirror.

The video processing unit 6 converts data format of the videos captured by the cameras 1-5 to accessible multimedia format so that the video can be displayed on the display 832 and stored in the storage unit 7.

The storage unit 7 comprises multiple storage zones 71-75 respectively corresponding to the cameras 1-5 to form a multi-channel data accessing configuration. The storage zones 71-75 may be implemented by partitioning a single memory to multiple regions, or be comprised of separate memories. In this embodiment, the storage unit 7 is a single memory being partitioned to multiple channels for recording videos in VGA format, and the data compression format may use MJPEG or H.264. If the memory has capacity of 16 GB, recording time for the MJPEG format is about 3 hours, and for the H.264 format the recording time is about 12 hours.

When the car is at rest, all cameras 1-5 stop operating. If the signal detecting module 81 senses a car-invasion signal such as receiving a G-sensor signal, a vibration signal or other signals representing that an invader enters the car, the central control module 87 activates the internal camera 5 to record video and store the video in the fifth storage zone 75. In addition, the video captured by the internal camera 5 can be transmitted via the wireless transmission module 84 to a designated remote device, such as a remote server or a mobile phone, through GPRS, GMS or 3G. Thus, the server or the mobile phone can remotely monitor the car for anti-theft purposes. If the signal detecting module 82 subsequently detects that the car has been activated without triggering the reset module 86, the central control module 87 will turn on all cameras 1-5 and store the captured videos in the storage unit 7.

When the car is moving, the front camera 1 continuously captures video and stores the video in the first storage zone 71. If the signal detecting module 81 detects a turn signal of the car, the central control module correspondingly activates either the left side camera 3 or the right side camera 4 based on the turn signal and stores the captured video in the second storage zone 72 or the third storage zone 73. In this embodiment, the left side camera 3 or the right side camera 4 will be activated for 0.7 seconds.

When the car is moving and the distance detecting module 82 senses an object appearing in either the first sensing region 821 or the second sensing region 822, the central control module 87 controls the rear camera 2 to capture video and store the video in the fourth storage zone 74 until the object leaves the first sensing region 821 or the second sensing region 822.

When the car speed is lower than a threshold, for example, 60 km/hr, and the distance detecting module 82 senses an object in the first sensing region 821, the central control module 87 will store the video captured by the rear camera 2 in the fourth storage zone 74 until the object leaves the first sensing region 821. When the car speed is higher than the threshold, for example, 60 km/hr, and the distance detecting module 82 senses an object appearing in the second sensing region 822, the central control module 87 will store the video captured by the rear camera 2 in the fourth storage zone 74 until the object leaves the second sensing region 822.

When the car is moving and the signal detecting module 81 receives the lane departure signal, the central control module 87 controls the front camera 1, the rear camera 2, the left side camera 3 and the right side camera 4 to record their videos in the first to fourth storage zones 71-74 respectively. The output module 83 is also controlled to output the warning signals for a predetermined time or until the lane departure signal ends.

When the car is moving and the signal detecting module 81 receives a car backing signal, the central control module 87 controls the rear camera 2 to record video in the fourth storage zone 74 until the reverse gear of the car is released.

With the structure as described above, the vehicle video recording apparatus of the present invention has the following features.

1. Full views around the car are captured and recorded by these cameras 1-5 mounted on the car to eliminate the driver's blind spot. The cameras 1-5 can be automatically and dynamically activated in accordance with different car statuses to record the videos.

2. Based on the sensed car speed and detecting results of the distance detecting module 82, the rear camera 2 can monitor any object approaching the car to ensure driving security.

3. Even though the car is completely at rest, the internal camera 5 still functions to capture views in the car. The vehicle owner can remotely monitor if any invader gets into the car.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A vehicle video recording apparatus comprising:
   multiple cameras adapted to be mounted on a car and outputting videos related to the car, wherein the cameras includes:

a front camera for capturing views in front of the car;
a rear camera for capturing views behind the car;
a left side camera and a right side camera for respectively capturing views at left and right sides of the car; and
an internal camera for capturing views in the car;
a video processing unit electronically connected to the cameras and processing the videos output from the cameras;
a storage unit electronically connected to the video processing unit and storing the videos output from the cameras;
a control unit electronically connected to the video processing unit for controlling the cameras, wherein the control unit comprises:
a signal detecting module for receiving vehicle status signals;
a distance detecting module for sensing a distance between the car and an object behind the car;
an output module for outputting warning signals; and
a central control module for controlling the cameras;
wherein when the car is at rest and the signal detecting module detects a car-invasion signal, the central control module activates the internal camera and records the video output from the internal camera in the storage unit;
when the car is moving, the front camera is activated and the video from the front camera is stored in the storage unit; if the signal detecting module detects a turn signal, the central control module activates either the left side camera or the right side camera according to the turn signal, and records the videos from the left side camera and the right side camera in the storage unit;
when the distance detecting module senses an object behind the car within a predetermined region, the central control module activates the rear camera and records the video from the rear camera in the storage unit; and
when the signal detecting module detects a lane departure signal, the central control module activates the front camera, the rear camera, the left side camera and the right side camera, and stores the videos thereof in the storage unit.

2. The vehicle video recording apparatus as claimed in claim 1, wherein the control unit further comprises:
an operating interface provided for operating the vehicle video recording apparatus; and
the output module including a warning light, and a display that shows the videos output from the cameras or the videos recorded in the storage unit.

3. The vehicle video recording apparatus as claimed in claim 2, wherein the central control module, the operating interface and the display are adapted to be mounted on a rear-view mirror of the car.

4. The vehicle video recording apparatus as claimed in claim 1, wherein when the signal detecting module receives a car backing signal, the central control module activates the rear camera and records the video of the rear camera in the storage unit.

5. The vehicle video recording apparatus as claimed in claim 1, wherein the control unit further comprises:
a wireless transmission module electronically connected to the central control module;
when the signal detecting module detects the car-invasion signal, the central control module activates the internal camera and further transmits the video output from the internal camera via the wireless transmission module to a remote device.

6. The vehicle video recording apparatus as claimed in claim 1, wherein the distance detecting module sets a first sensing region with a first sensing distance, and sets a second sensing region with a second sensing distance greater than the first sensing distance; wherein
when a speed of the car is lower than a threshold and the distance detecting module senses an object appearing in the first sensing region, the central control module stores the video output by the rear camera in the storage unit; and
when the speed of the car is higher than the threshold and the distance detecting module senses an object appearing in the second sensing region, the central control module stores the video output by the rear camera in the storage unit.

7. The vehicle video recording apparatus as claimed in claim 1, wherein the control unit further comprises a reset module for resetting the vehicle video recording apparatus; and
wherein the central control module activates all cameras when the signal detecting module detects the car has been started without triggering the reset module.

* * * * *